United States Patent Office 3,466,308
Patented Sept. 9, 1969

3,466,308
PREPARATION OF ORGANIC ACIDS
Herbert L. Wehrmeister, Terre Haute, Ind., assignor to Commercial Solvents Corporation, New York, N.Y., a corporation of Maryland
No Drawing. Continuation-in-part of application Ser. No. 254,010, Jan. 25, 1963. This application Feb. 6, 1967, Ser. No. 614,026
Int. Cl. C07c 63/04, 57/02
U.S. Cl. 260—413                                6 Claims

ABSTRACT OF THE DISCLOSURE

A method for preparing compounds of the class of unsaturated aromatic acids and unsaturated aliphatic acids, useful is intermediates in the preparation of perfumes, cosmetics, polymers and plant growth modifiers, by the acid-catalyzed hydrolysis of 2-substituted-2-oxazolines.

CROSS-REFERENCE TO RELATED APPLICATIONS

This application is a continuation-in-part of Ser. No. 254,010, filed Jan. 25, 1963, now abandoned.

SUMMARY OF THE INVENTION

This invention relates to a method for producing oxazoline derivatives. In a particular aspect it relates to a method for producing unsaturated aromatic acids and unsaturated aliphatic acids from 2-substituted-2-oxazolines.

The products produced by the present invention are useful as intermediates in the preparation of perfumes, cosmetics and other products, such as polymers, and plant growth modifiers.

An object of the present invention is the provision of a method for the production of compounds, Compounds E, having the formula

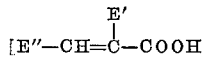

wherein E″ can be hydrogen, alkyl of from 1 to 14 carbon atoms, aryl [including halogen-(e.g. chlorine-), hydroxy-, dialkyl-(e.g., dimethyl-)amino-, and nitro-substituted aryl]; and E′ can be hydrogen, alkyl of from 1 to about 20 carbon atoms, alkenyl of from 2 to about 20 carbon atoms, or aryl.

In accordance with the present invention, Compounds E corresponding to the above formula are advantageously prepared by the hydrolysis of Compounds A, 2-substituted-2-oxazolines, corresponding to the formula

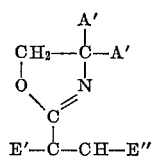

wherein A′ can be hydrogen, alkyl, e.g. lower alkyl of from 1 to about 3 carbon atoms, or hydroxyalkyl, e.g. lower hydroxyalkyl of from 1 to about 3 carbon atoms; E″ can be hydrogen, alkyl of from 1 to 14 carbon atoms or aryl [including halogen-(e.g. chlorine-), hydroxy-, dialkyl-(e.g. dimethyl)amino-, and nitro-substituted aryl]; and E′ can be hydrogen, alkyl of from 1 to about 20 carbon atoms, alkenyl of from 2 to about 20 carbon atoms, or monocyclic aryl.

The starting Compounds A include phenylethenyl oxazolines and aliphatic ethenyl oxazolines. This hydrolysis is advantageously acid catalyzed, with an acid selected from the group described below, preferably with mineral acids, e.g. HCl and H₂SO₄, under hydrolysis conditions including the heating of starting Compounds A, i.e. the oxazolines, for instance to reflux conditions in the presence of a mineral acid for a period of time sufficient to effect the hydrolysis, for instance for a time of about 0.1 to 15 hours. The amount of acid to be used can vary widely without appreciably affecting the rate of hydrolysis. Generally, a weight of acid, dry basis, approximately aquivalent to the weight of oxazoline is selected. Preferably, the acid is diluted by 2–5 volumes of water before hydrolysis. Completion of hydrolysis of the aromatic compounds can be indicated by the formation and then the cessation of precipitation.

DETAILED DESCRIPTION

The phenylethenyl-oxazolines used for the preparation of the unsaturated aromatic acids of this invention, Compounds E, are those represented by the above formula wherein E″ is aryl, including substituted aryl; and E′ has the meaning described above.

The aliphatic ethenyl oxazolines are those represented by the above formula wherein E′ and E″ are hydrogen, alkyl, or alkenyl.

These ethenyl-oxazolines, Compounds A, are prepared by reacting compounds having the formula

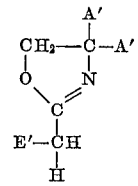

wherein A′ and E′ have the same meaning set forth above, with an organic carbonyl compound, e.g. aldehydes which generally contain from about 1 to 15 carbon atoms, under reaction conditions to react the carbonyl group of the carbonyl compound with the —CH— radical attached to the 2-position of the heterocyclic compound and this reaction can be advantageously conducted under catalytic conditions.

Among the oxazoline compounds useable in producing the Compounds A are, for example, 2-ethyl-4,4-dimethyl-2-oxazoline;
2-propyl-4,4-dimethyl-2-oxazoline;
2-benzyl-4-methyl-4-hydroxymethyl-2-oxazoline;
2-methyl-4,4-bis(hydroxymethyl)-2-oxazoline;
2,4,4-trimethyl-2-oxazoline;
2-ethyl-2-oxazoline;
2-ethyl-4-methyl-4-hydroxymethyl-2-oxazoline;
and 2-heptadecenyl-4,4-dimethyl-2-oxazoline.

Suitable organic carbonyl compounds include aromatic and aliphatic aldehydes, e.g. alkanals containing generally from about 1 to 15 carbon atoms, for instance formaldehyde, benzaldehyde, para-chlorobenzaldehyde, ortho-chlorobenzaldehyde, para-hydroxybenzaldehyde, para-dimethylaminobenzaldehyde, and meta-nitrobenzaldehyde.

The reaction for the preparation of Compounds A can be conducted at temperatures generally from about 60 to 250° C., preferably from about 100 to 190° C., and advantageously in the presence of catalytic amounts of an acidic catalyst. The amount of catalyst employed will depend upon the particular catalyst selected; however, these amounts will generally range from about 0.001 to 0.1 to 10 percent or more of the catalyst, preferably from about 0.5 to 5 percent based on the oxazoline.

Suitable acid catalysts include organic and inorganic catalysts and include inorganic mineral acids such as sulphuric, hydrochloric and phosphoric acids, organic carboxylic and sulphonic acids, such as formic, benzene-sulphonic, p-xylenesulphonic, p-toluenesulphonic, naphthalenesulphonic acids, inorganic and organic salts such as sodium bisulphate, primary ammonium phosphate, calcium chloride, zinc chloride, aluminum chloride, ammonium chloride, ammonium bromide, hydroxylammonium chloride, boron trifluoride, and boron trifluoride-ether complex and halogen, such as iodine. Iodine, p-xylenesulphonic acid, zinc chloride and sodium bisulphate have been found to be particularly advantageous as catalysts.

The reaction can also be carried out in the presence of solvents, for example, hydrocarbons such as hexane, octane, benezene, xylene, etc.; ethers such as dioxane; halogenated hydrocarbons, etc. Some of the solvents can also be advantageously used as azeotropic agents to aid in the removal of the water resulting from the reaction.

In the reaction, particularly with aliphatic aldehydes, it is generally advantageous to include a polymerization inhibitor in the reaction mixture to prevent the formation of polymeric products when the monomer is desired. It is therefore desirable to use oxazolines containing such an inhibitor or to add polymerization inhibitors like di-beta-naphthol, hydroquinone, p-hydroxydiphenylamine, N,N'-diphenyl-phenylenediamine, 2,5-di-tert-butylhydroquinone, trinitrotoluene, copper carbonate, or methylene blue. These have been found particularly effective for this purpose and other similar inhibitors are well known in the art. The inhibitor is used in an amount from about 0.1 to about 10%, preferably from about .05 to about 5% by weight based on the oxazoline.

The phenylethenyl-oxazolines employed in the preparation of the cinnamic acids as described in the examples were prepared generally by the iodine-catalyzed condensation of oxazolines with aromatic aldehydes by the following general procedure. Alkylethenyl-oxazolines useful for the preparation of unsaturated aliphatic acids are prepared in the same manner except that an aliphatic aldehyde, e.g. formaldehyde, is employed instead of an aromatic aldehyde.

The aldehyde (1 mole), oxazoline (1 mole), and toluene (100 ml.) or in some cases benzene were charged to a 500 ml. flask equipped with a sealed stirrer, thermometer, Vigreux column (18"), water separator (20 ml.), and reflux condenser. The mixtures were then heated under reflux for several hours with azeotropic removal of water. If after several hours it was evident that the reaction was not proceeding at an appreciable rate, there was added 1 g. of iodine. The water evolution would start almost immediately. The heating was continued until water evolution was essentially completed. Part of the toluene was removed by distillation if a high pot temperature was desired. Occasionally a second or third 1 g. portion of iodine was added in an attempt to speed up the reaction.

Reactions using materials other than iodine as a catalyst were conducted similarly except that the materials were added from the start of the run rather than after several hours of heating. Five grams each of xylenesulphonic acid, zinc chloride and sodium bisulphate were used.

After the water of reaction was removed the mixtures were distilled at reduced pressure through an 18" Vigreux column, except that the p-hydroxy derivative was isolated by crystallization rather than distillation. Some properties of the products obtained are summarized in Table I. Some of the products could be solidified, but limited attempts to develop good methods of recrystallization were not very successful except in the case of the p-hydroxy derivative. All but the p-dimethylamino product would remain liquid unless special attempts at crystallization (seeding, cooling, etc.) were made. The p-dimethylamino derivative generally solidified to a low-melting, yellow solid.

The phenylethenyl oxazoline compounds produced in the following examples are of the formula

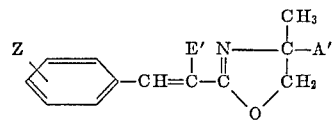

wherein the values for A' Z and E' are set forth in Table I below.

TABLE I

| Product | | | B.P., °C. (mm.) | Product analyses | | | |
|---|---|---|---|---|---|---|---|
| | | | | Calcd. | | Found | |
| Z | E' | A' | | N | Neut. equiv. | N | Neut. equiv. |
| H | CH₃ | CH₃ | 117(0.9) 120(0.6) | -------- | 215.3 | -------- | 219.5 |
| p-Cl | CH₃ | CH₃ | 133(1.0) 151(1.5) | 5.61 | 249.7 | 5.49 | 251.6 |
| o-Cl | CH₃ | CH₃ | 133(0.5) | 5.61 | 249.7 | 5.50 | 261 |
| p-HO | CH₃ | CH₃ | ¹ 176–177 | 6.06 | 231.3 | 5.93 | 240 |
| p-Me₂N | CH₃ | CH₃ | 155(0.6) 163(0.3) | 10.84 | 129.2 | 11.47 | 136.3 |
| m-NO₂ | CH₃ | CH₃ | 155(0.6) 159(0.4) | 10.76 | 260.3 | 10.80 | ² 261.3 |
| p-Cl | CH₃ | CH₂OH | 168(0.3) 182(0.6) | -------- | 265.7 | -------- | ³ 272 |
| H | H | CH₃ | 112(0.4) 120(0.5) | 6.96 | 201.3 | 6.88 | 206.1 |
| p-Cl | C₁₆H₃₁ | CH₃ | 209(0.9) 248(0.7) | 3.06 | 458 | 3.93 | ⁴ 1,360 |
| p-Cl | H | CH₃ | 140–160 (0.9) | 5.90 | 235.7 | 6.09 | ⁵ 238.8 |

¹ Recrystallized.
² Redistilled.
³ Calcd: Cl, 13.34. Found: Cl, 12.38, 12.70.
⁴ Calcd.: Cl, 7.74. Found: Cl, 7.66.
⁵ Calcd.: Cl, 14.61. Found: Cl, 15.04.

EXAMPLES 1–7

Hydrolysis of phenlethenyloxazolines to cinnamic acids

The phenylethenyloxazolines were hydrolized to the cinnamic acids by the following general procedure, used with but minor modifications for every example given.

The phenylethenyloxazoline (0.1 mole) was dissolved in 200 ml. of dilute hydrochloric acid (1 part conc. HCl to 3 parts H₂O) and heated at reflux for three hours. The precipitated solid was collected by filtration, washed with 2× 50 ml. of water and dried. This crude product (used as a basic for the reported yields) was recrystallized, generally from ethanol to give a product with a melting point usually in close agreement with the literature values. The products were recrystallized until no change in melting point occurred. These products were then submitted for analysis by titration.

In the case of the p-dimethylamino derivative the pH of the mixture after hydrolysis was adjusted to 4 by the addition of aqueous sodium hydroxide solution. The precipitated solid was then collected, washed, dried and recrystallized as in the other examples. The results are given in Table II.

The following examples will serve to illustrate the invention but they are not to be considered limiting. Temperatures are given in centigrade.

The compounds produced in these Examples 1 to 7 are of the formula $$Z\text{-}C_6H_4\text{-}CH=C(E')\text{-}COOH$$

wherein the values for Z and E' are set forth in Table II below for the given examples. E' has the same meaning as hereinbefore set forth. The starting materials employed were of the formula $$Z\text{-}C_6H_4\text{-}CH=C(E')\text{-}C(\text{N-C(CH}_3)_2\text{-CH}_2\text{-O})$$

wherein the values for Z and E' are set forth in Table II below for the given examples.

minutes. The mixture was then distilled until all the remaining toluene was removed [b]. The clear solution was refluxed for one hour and left at room temperature overnight. An additional 100 ml. of water was added to the liquid-solid mixture, and refluxing was continued for an additional two hours. The mixture was cooled to room temperature and the solid (A) was collected by filtration, washed with 2× 50 ml. of water, and dried finally in a vacuum oven at 55–60°. This material weighed 19.4 g. and had a melting point of 205–206°.

A second crop of product (B) 6.0 g., M.P. 204.5–205° was obtained by refluxing the filtrate from A for three hours, cooling, filtering, washing and drying as before. The total yield of product was 25.4 g. or 61%. Recrystallization of A from 350 ml. of ethanol yielded 16.4 g. of product, M.P. 204–205°. The reported M.P. is 202–203°.

*Analysis.*—Calcd. for $C_{10}H_9NO_4$: Neut. equiv. 207.2. Found: Neut. equiv. 207.0

EXAMPLE 9

Essentially the same procedure employed in Examples 1–7 is followed except 2-(1,2-diphenylethenyl)-2-oxazoline is hydrolized to produce an acid having the formula $$C_6H_5\text{-}CH=C(C_6H_5)\text{-}COOH$$

EXAMPLE 10

A mixture of 60.4 g. of m-nitrobenzaldehyde with 104 g. of 2-ethyl-4,4-dimethyl-2-oxazoline and 3 g. of sodium bisulphate in 100 ml. of toluene was heated at reflux (130–137°) for 7 hours with azeotropic removal of 7 ml. of water. Toluene and excess oxazoline were removed by distillation to a pot temperature of 182°. Water (100

TABLE II $$Z\text{-}C_6H_4\text{-}CH=C(E')\text{-}COOH$$

[Alpha-Methylcinnamic Acids From the Hydrolysis of Oxazolines]

| Examples: | Z | E' | Yield Percent[1] | Yield Percent[2] | M.P., °C., found[3] | M.P., °C., lit. | Neut. equivalent Calcd. | Neut. equivalent Found[3] |
|---|---|---|---|---|---|---|---|---|
| 1 | H | CH₃ | 92 | 83 | 80.5–81 | 80–81 | 162.2 | 167.0 |
| 2 | p-Cl | CH₃ | 92 | 69 | 166–167 | 166–167 | 196.6 | 196.2 |
| 3 | o-Cl | CH₃ | 99 | 73 | 108–109 | 109.5–110.5 | 196.6 | 198.0 |
| 4 | p-Me₂N | CH₃ | 80 | 44 | 210–211 | 204–204.5 | 205.3 | [4] 205.6 |
| 5 | m-NO₂ | CH₃ | 94 | [5] 30 | 203–205 | 202–203 | 207.2 | 208.4 |
| 6 | H | H | 97 | 75 | 134–135 | 133 | 148.2 | 149.4 |
| 7 | p-Cl | H | 100 | 70 | 248–249 | 249–250 | 182.6 | 182.9 |

[1] Based on oxazoline. Before recrystallization of the cinnamic acid.
[2] Based on aldehyde. Before recrystallization of the cinnamic acid.
[3] For recrystallized sample.
[4] Neut. equivalent as a base 205.8.
[5] A 61% yield to the cinnamic acid was obtained when the oxazoline was not isolated.

EXAMPLE 8

Preparation of alpha-methyl-m-nitrocinnamic acid from m-nitrobenzaldehyde and 2-ethyl - 4,4 - dimethyl-2-oxazoline without isolation of intermediates A mixture of 30.2 g. of m-nitrobenzaldehyde, 26 g. of 2-ethyl-4,4-dimethyl-2-oxazoline and 1 g. of sodium bisulphate in 100 ml. of toluene was heated under reflux with azeotropic removal of water as in the standard procedure. There was obtained 3.0 ml. of water in five hours of refluxing at a pot temperature of 118 to 179° C.[a] The mixture was cooled to 100° and a solution of 17 ml. of concentrated H₂SO₄ in 133 ml. of water was added in 5 ml.) was added and the remaining toluene (13 ml.) was removed by azeotropic distillation, with the water being returned to the pot. Concentrated hydrochloric acid (100 ml.) was added, and the mixture was heated at reflux for 6 hours, cooled and filtered. The filter cake was washed with three 100 ml. portions of water and dried finally in a vacuum oven at 55–60°.

This product, alpha-methyl-m-nitrocinnamic acid, weighed 74.4 g. (90% yield) and had a melting point of 196.5–198°. Recrystallization from ethanol yielded material with a melting point of 202–203° and a neutralization equivalent of 208.0.

This also shows the advantage of using a mole ratio of the oxazoline to the aldehyde greater than 1:1, e.g. 1.2 to 3:1, to produce enhanced yields.

---

[a] It was necessary to remove part (finally 85 ml.) of the toluene by distillation to increase the pot temperature to the value indicated.

[b] About 46 ml. of distillate was collected, of which 13 ml. was an upper organic phase.

EXAMPLES 11–15

Essentially the same procedure employed in Examples 1–7 is followed except 2-alkenyl oxazolines are hydrolyzed to produce unsaturated aliphatic acids. The oxazolines employed correspond to the formula $$H_2C\underset{\underset{\underset{E'-C=CH-E''}{\diagdown C \diagup}}{O}}{\overset{\overset{A'}{|}}{-}}\overset{|}{C}-A'$$

wherein E' is alkyl or alkenyl; E'' is hydrogen; and A' has the meaning hereinbefore set forth. They are hydrolyzed to produce aliphatic acids corresponding to the formula $$E''-CH=\overset{\overset{E'}{|}}{C}-COOH$$

wherein E'' is hydrogen, and E' has the values set forth in Table III below.

TABLE III.—ALIPHATIC ACIDS FROM THE HYDROLYSIS OF OXAZOLINES

| Example: | E' | Aliphatic acid |
|---|---|---|
| 11 | $CH_3$ | $CH_2=\underset{\underset{CH_3}{|}}{C}-COOH$; α-methylacrylic acid. |
| 12 | $C_2H_5$ | $CH_2=\underset{\underset{C_2H_5}{|}}{C}-COOH$; α-ethylacrylic acid. |
| 13 | H | $CH_2=CH-COOH$; acrylic acid. |
| 14 | $C_{16}H_{31}$ | $CH_2=\underset{\underset{C_{16}H_{31}}{|}}{C}H-COOH$; α-ethenyl oleic acid. |
| 15 | Phenyl | $CH_2=\underset{\underset{C_6H_5}{|}}{C}-COOH$; α-phenylacrylic acid. |

The hydrolysis is conducted in the presence of 1% of 2,5-di-tert-butylhydroquinone, based on the weight of the oxazoline, as a polymerization inhibitor.

What is claimed is:

1. A method for preparing compounds having the formula $$E''-CH=\overset{\overset{E'}{|}}{C}-COOH$$

wherein E' is selected from the group consisting of hydrogen, alkyl of from 1 to about 20 carbon atoms, alkenyl of from 2 to about 20 carbon atoms and monocyclic aryl; E'' is selected from the group consisting of hydrogen, alkyl of from 1 to 14 carbon atoms, and monocyclic aryl, which comprises hydrolyzing under hydrolysis conditions in the presence of an added acid catalyst an oxazoline compound having the formula $$H_2C\underset{\underset{\underset{E'-C=C-E''}{\diagdown C \diagup}}{O}}{\overset{\overset{A'}{|}}{-}}\overset{|}{\underset{N\ H}{C}}-A'$$

wherein A' is selected from the group consisting of hydrogen, alkyl of from 1 to about 3 carbon atoms and hydroxyalkyl of from 1 to about 3 carbon atoms; E'' is selected from the group consisting of hydrogen, alkyl of 1 to 14 carbon atoms and monocyclic aryl; and E' is selected from the group consisting of hydrogen, alkyl of from 1 to about 20 carbon atoms, alkenyl of from 2 to about 20 carbon atoms and monocyclic aryl, said hydrolysis conditions comprising heating said oxazoline at reflux temperature in the presence of said acid catalyst for a time sufficient to effect said hydrolysis, said acid catalyst being diluted with from about 2 to about 5 volumes of water.

2. The method of claim 1 for preparing compounds having the formula $$E''-CH=\overset{\overset{E'}{|}}{C}-COOH$$

wherein E' is selected from the group consisting of hydrogen, alkyl and monocyclic aryl, and E'' is selected from the group consisting of hydrogen, alkyl of 1 to 14 carbon atoms and monocyclic aryl which comprises hydrolyzing a compound having the formula $$CH_2\underset{\underset{\underset{E'-C=C-E''}{\diagdown C \diagup}}{O}}{\overset{\overset{A'}{|}}{-}}\overset{|}{\underset{N}{C}}-A'\quad H$$

wherein A' is selected from the group consisting of hydrogen, lower alkyl and hydroxy-lower alkyl; E'' is selected from the group consisting of hydrogen, alkyl of 1 to 14 carbon atoms and monocyclic aryl; and E' is selected from the group consisting of hydrogen, alkyl and monocyclic aryl under hydrolysis conditions in the presence of an acid catalyst.

3. The method of claim 1 for preparing compounds having the formula $$\underset{Z}{\underset{|}{\text{(phenyl)}}}-CH=\overset{\overset{E'}{|}}{C}-COOH$$

wherein E' is selected from the group consisting of hydrogen, alkyl of from 1 to about 20 carbon atoms, alkenyl of from 2 to about 20 carbon atoms and monocyclic aryl; Z is selected from the group consisting of hydrogen, chlorine, hydroxy, methylamino, and nitro, which comprises hydrolyzing a compound having the formula $$CH_2\underset{\underset{\underset{E'-C=C-\text{(phenyl-Z)}}{\diagdown C \diagup}}{O}}{\overset{\overset{A'}{|}}{-}}\overset{|}{\underset{N}{C}}-A'\quad H$$

wherein A' is selected from the group consisting of hydrogen, alkyl of from 1 to about 3 carbon atoms, hydroxyalkyl of from 1 to about 3 carbon atoms; E' is selected from the group consisting of hydrogen, alkyl of from 1 to about 20 carbon atoms, alkenyl of from 2 to about 20 carbon atoms and monocyclic aryl; and Z has the meaning defined above, under hydrolysis conditions in the presence of an acid catalyst.

4. The method of claim 1 wherein the hydrolysis is conducted at a temperature of from about 60° C. to about 250° C.

5. The method of claim 1 wherein the hydrolysis is conducted at a temperature of from about 100° C. to about 190° C. for a period of time of from about 0.1 to about 15 hours.

6. The method of claim 1 for preparing compounds having the formula $$CH_2=\overset{\overset{E'}{|}}{C}-COOH$$

wherein E' is selected from the group consisting of hydrogen, alkyl of from 1 to about 20 carbon atoms, and alkenyl of from 2 to about 20 carbon atoms.

References Cited

Billman et al.: Jour. Amer. Chem. Soc., vol. 67, pp. 1069–1070, 1945.

LEON ZITVER, Primary Examiner

HOWARD T. MARS, Assistant Examiner

U.S. Cl. X.R.

260—307, 515, 518, 520, 526

UNITED STATES PATENT OFFICE
CERTIFICATE OF CORRECTION

Patent No. 3,466,308           Dated September 9, 1969

Inventor(s) Herbert L. Wehrmeister

It is certified that error appears in the above-identified patent and that said Letters Patent are hereby corrected as shown below:

Column 1, line 58, that portion of the formula reading

"$E'-\overset{|}{C}-CH-E''$" should read -- $E'-\overset{|}{C}=CH-E''$ --

Column 2, line 8, "aquivalent" should read -- equivalent --.
Column 3, line 13, "benezene" should read -- benzene --.
Column 3, line 30, ".05" should read -- 0.5 --.
Column 5, line 4, "basic" should read -- basis --.
Column 6, line 23, "hydrolized" should read -- hydrolyzed --.
Column 7, line 62, that portion of the formula reading "$E' - \overset{O\diagdown N\diagup H}{C} = C - E''$" should read -- $E' - \overset{O\diagdown N}{\underset{|}{C}} = C - E''$ --

Signed and sealed this 17th day of September 1974.

(SEAL)
Attest:

McCOY M. GIBSON JR.           C. MARSHALL DANN
Attesting Officer             Commissioner of Patent